(12) United States Patent
Oda

(10) Patent No.: US 11,229,217 B2
(45) Date of Patent: Jan. 25, 2022

(54) APPARATUS AND METHOD FOR QUICKLY REMOVING BLOOD FROM FISH BODY BY JETTING HIGH-PRESSURE WATER INTO HEMAL ARCH

(71) Applicant: Madoka Oda, Tokyo (JP)

(72) Inventor: Madoka Oda, Tokyo (JP)

( * ) Notice: Subject to any disclaimer, the term of this patent is extended or adjusted under 35 U.S.C. 154(b) by 0 days.

(21) Appl. No.: 16/963,653

(22) PCT Filed: Jan. 29, 2018

(86) PCT No.: PCT/JP2018/002625
§ 371 (c)(1),
(2) Date: Jul. 21, 2020

(87) PCT Pub. No.: WO2019/146092
PCT Pub. Date: Aug. 1, 2019

(65) Prior Publication Data
US 2021/0059268 A1    Mar. 4, 2021

(51) Int. Cl.
*A22C 25/00*    (2006.01)
*A22C 25/02*    (2006.01)
*A22C 25/14*    (2006.01)

(52) U.S. Cl.
CPC ............. *A22C 25/02* (2013.01); *A22C 25/14* (2013.01)

(58) Field of Classification Search
CPC ......... A22C 25/00; A22C 25/02; A22C 25/14; A22B 5/04
USPC .......................................... 452/102–105, 173
See application file for complete search history.

(56) References Cited

U.S. PATENT DOCUMENTS

| | | | | |
|---|---|---|---|---|
| 2,928,118 A * | 3/1960 | Hairston | ................ | A22C 25/02 452/81 |
| 4,020,528 A * | 5/1977 | Lindbladh | .............. | A22C 25/17 452/131 |
| 4,258,452 A * | 3/1981 | Adcock | ................ | A22C 25/025 452/105 |
| 4,339,850 A * | 7/1982 | Altman | .................. | A22C 25/02 401/207 |

(Continued)

FOREIGN PATENT DOCUMENTS

| | | |
|---|---|---|
| JP | H07-264968 A | 10/1995 |
| JP | 2000-166459 A | 6/2000 |

(Continued)

*Primary Examiner* — Richard T Price, Jr.
(74) *Attorney, Agent, or Firm* — Im IP Law; Chai Im; C. Andrew Im

(57) ABSTRACT

A device and method configured to jet pressurized liquid from hemal arch of fish into arteries and veins to perform instantaneous fish body blood removal, thereby cleansing the blood vessel interior. The device jets pressurized liquid into hemal arch from severed fish tail to perform fish ikijime (quality-preserving quick kill). A pressure applying device applies pressure to and discharges liquid and a hose conveys the pressurized liquid discharged from the pressure applying device. A valve connected to the hose opens and closes the flow path of the liquid and a nozzle jets the liquid when the valve is in open state. The valve opens or closes the flow path in response to a button being pushed down or pulled up. The nozzle is formed to taper from a large diameter base region toward a tip region, and tip region center hole diameter is formed thin.

3 Claims, 2 Drawing Sheets

(56) References Cited

U.S. PATENT DOCUMENTS

| | | | | |
|---|---|---|---|---|
| 4,875,254 | A  * | 10/1989 | Rudy | A22C 17/002 |
| | | | | 452/157 |
| RE33,917 | E  * | 5/1992 | Lapeyre | A22C 25/00 |
| | | | | 452/157 |
| 5,162,016 | A  * | 11/1992 | Malloy | A22B 5/0029 |
| | | | | 452/149 |
| 6,857,951 | B1 * | 2/2005 | Pauley | B26B 11/00 |
| | | | | 452/102 |
| 7,179,162 | B1 * | 2/2007 | Twiner | A22C 25/025 |
| | | | | 452/105 |
| 11,000,044 | B1 * | 5/2021 | Williamson | A47B 13/003 |

FOREIGN PATENT DOCUMENTS

| | | |
|---|---|---|
| JP | 2008-212050  A | 9/2008 |
| JP | 2013-039504  A | 2/2013 |
| JP | 2014-200737  A | 10/2014 |

* cited by examiner

APPARATUS AND METHOD FOR QUICKLY REMOVING BLOOD FROM FISH BODY BY JETTING HIGH-PRESSURE WATER INTO HEMAL ARCH

RELATED APPLICATIONS

This application is a § 371 application from PCT/JP2018/002625 filed Jan. 29, 2018, which is herein incorporated by reference in its entirety.

TECHNICAL FIELD

The present invention relates to a device and method for ikijime (quality-preserving quick kill) of fish, particularly to a device and method for instantaneous flushing of fish body blood (blood removal) by jetted discharge of blood in arteries and veins of a fish using pressurized liquid to perform neat, instantaneous blood drainage and achieve complete removal of blood from blood vessels, thereby enabling long-term preservation of fish freshness after ikijime without need for any other preservation processing or the like.

BACKGROUND OF THE INVENTION

Devices and methods for ikijime of fish are already available and numerous such ikijime devices and methods are in use for preserving fish freshness and taste. Among the purposes of ikijime can be mentioned prevention of taste degradation by accumulation of lactic acid and the like, inhibition of rotting by delaying rigor mortis, inhibition of bacteria proliferation in residual blood, prevention of oxidative decay of residual blood per se, prevention of fish internal ATP consumption by thrashing, and prevention of rotting starting from congested regions caused by bruises resulting from thrashing.

A conventional method of fish ikijime initially uses piano wire to destroy the nervous system as a first step. Specifically, a thin piano wire implement or similar is penetrated along the fish spinal cord to destroy the nerve, thereby delaying rigor mortis and helping to preserve freshness. This method can prevent ATP consumption caused by fish thrashing, can prevent taste degradation owing to accumulation of lactic acid and the like, and, by delaying rigor mortis, can inhibit rotting.

However, expert skill is required to insert a thin wire along a fish's spinal cord. The conventional method is therefore disadvantageous in that simple, efficient ikijime is hard to achieve, and since bacteria proliferate in residual blood unless through blood flushing is reliably performed in addition to spinal cord removal, performance of ikijime that maintains satisfactory mouthfeel cannot be realized.

JP2000-166459A relates to a technology for overcoming such problems. This document discloses a technique for performing fish ikijime, nerve extraction and blood flushing simultaneously, namely, a technique of sticking a blade into near the base of the fish caudal fin and simultaneously performing nerve extraction and blood flushing by jetting compressed air or other gas into neural arch. It discloses to the effect that the jetting of compressed air or other gas into neural arch instantaneously destroys the spinal nerves and blasts them from vertebral body on pre-severed head side, and that since vertebral body, vein and artery near the base of caudal fin are simultaneously severed, blood removal is achieved.

Although this technology does indeed enable simultaneous nerve extraction and blood flushing, its adoption of a method that jets compressed air or other gas into neural arch leaves the possibility of only vessel blood being strongly blown out while other blood still remains in surrounding regions, so that the technology cannot be considered capable of reliably removing blood completely. In other words, the fact that no liquid is used leads to inadequate cleansing, which in turn leads to likelihood of bacteria proliferation in residual blood and of similar issues that invite the conclusion that the technology is inadequate from the aspect of sanitation. Moreover, extra processing such as water washing or water emersion is necessary to ensure adequate cleansing. And since neural arch size varies with fish size, the technology has an inherent shortcoming from the viewpoint of cleansing versatility for coping with all sizes of fish and as such is inconvenient for not being able to deal with all kinds of fish. Another drawback is that the needle inserted through neural arch is apt to be bent or broken by fish thrashing.

Quality of fish freshness achieved depends greatly on reliable blood flushing and on whether blood is removed to a degree that guarantees satisfactory mouthfeel. Although various methods for ensuring total blood cleansing have therefore been developed, they have all proved time consuming. A desire has therefore been felt for development of a neat and reliable device and associated method capable of easily flushing out blood with high efficiency irrespective of fish size.

Patent Document 1: JP2000-166459A

SUMMARY OF THE INVENTION

Problem to be Overcome by the Invention

An object of the present invention is to overcome the aforesaid issues by providing a fish ikijime (quality-preserving quick kill) device and method, particularly a device and associated method for instantaneous removal of blood from fish body, which, unlike conventionally, are directed to blood flushing and ikijime of fish of any size without need for other blood removal and cleansing processes, by, unlike conventionally, instantaneously jetting pressurized high-pressure liquid from haemal arch or hemal arch of fish tail into blood vessels including arteries and veins to jet and discharge blood in said blood vessels in head direction and thereby instantaneously perform neat flushing discharge of blood and enable total removal of blood from blood vessels.

Means for Solving the Problem

In the present invention device for instantaneous removal of blood from fish body by jetting high-pressure water into haemal arch in order to achieve the aforesaid object, a device for blood flushing and ikijime of fish adapted for fish ikijime (quality-preserving quick kill) by pressurizing and jetting liquid into haemal arch from severed fish tail comprises a pressure applying device for applying pressure to and discharging liquid, a hose for conveying pressurized liquid discharged from the pressure applying device, a valve connected to the hose for opening and closing flow path of the liquid, and a nozzle for jetting the liquid when the valve connected to the hose is in open state, wherein the valve opens or closes the flow path in response to a button being pushed down or pulled up, the nozzle is formed to taper from a large diameter base region toward center of a tip region, and hole diameter of the tip region is formed thin.

Moreover, the method for instantaneous removal of blood from fish body by jetting high-pressure water into haemal arch in order to perform fish ikijime (quality-preserving quick kill) by jetting pressure applied liquid into haemal arch from severed fish tail comprises a step of head severing for severing and opening fish medulla oblongata, a step of tail severing for severing fish tail to expose spine and haemal arch, and a step of blood flushing by inserting a tapered nozzle with narrow tip region hole diameter into fish haemal arch exposed by the tail severing step and jetting liquid applied with pressure by the pressure applying device.

Further, in the present invention device for instantaneous removal of blood from fish body by jetting high-pressure water into haemal arch, a device for instantaneous removal of blood from fish body that performs fish ikijime (quality-preserving quick kill) by jetting pressure applied liquid into haemal arch from severed tail of fish comprises a hose for conveying pressure-applied liquid supplied through water piping, a valve connected to the hose for opening and closing a flow path of the liquid, and a nozzle for jetting the liquid when the valve connected to the hose is in open state, wherein the valve opens or closes the flow path in response to a button being pushed down or pulled up, the nozzle is formed to taper from a large diameter base region toward center of a tip region, and hole diameter of the tip region is formed thin.

Effects of the Invention

Since the present invention is configured as described in detail in the foregoing, it has the following effects:

1. Owing to the provision of the valve for opening and closing flow path of the pressurized fluid, the liquid applied with pressure can be reliably jetted into fish from tail haemal arch for a desired time period by a single operation, thereby enabling discharge (removal) of blood to a fully satisfactory degree. And since the nozzle is shaped to taper from the large diameter base region toward the tip region, it can be inserted into haemal arch of any size to reliably perform blood removal in a tightly sealed condition, thereby enabling provision of a blood flushing and ikijime device suitable for use with fish of any kind or size.

2. Since the invention method is one that jets pressure-applied liquid into haemal arch from severed tail of fish, it enables anyone to easily discharge vessel blood from arteries and veins without fail, while also achieving neat blood vessel interior cleansing without need to perform a blood removal process such as washing or soaking.

3. Since a structure is adopted that utilizes pressure-applied liquid supplied through water piping, adequate water pressure can be ensured even in the absence of a pressure applying device, thereby enabling discharge (removal) of fish body blood to a fully satisfactory level.

DETAILED DESCRIPTION OF THE EMBODIMENTS

Figure 1:
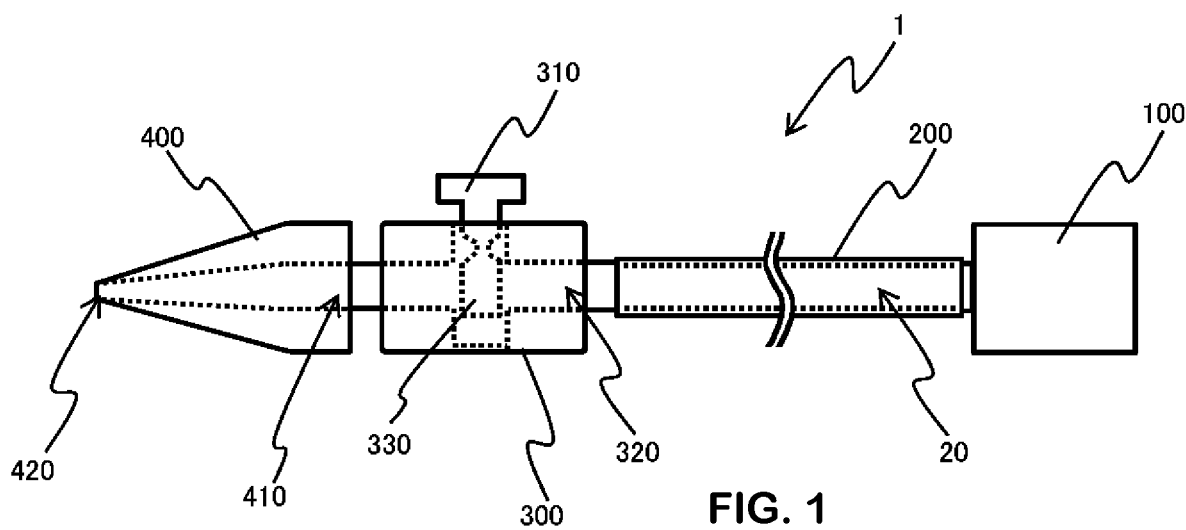
FIG. 1 is a side view of a device for instantaneous removal of blood from fish body according to the present invention.
Figure 2:
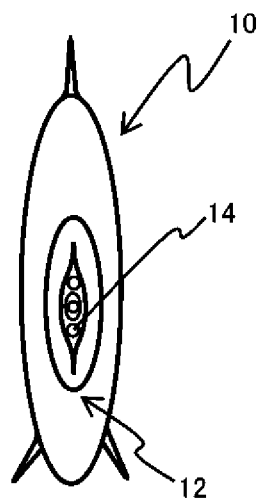
FIG. 2 is a cross-sectional view of a fish tail.
Figure 3:
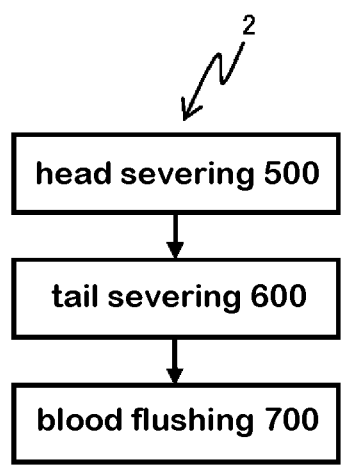
FIG. 3 is a flowchart of the method for instantaneous removal of blood from fish body.
Figure 4:
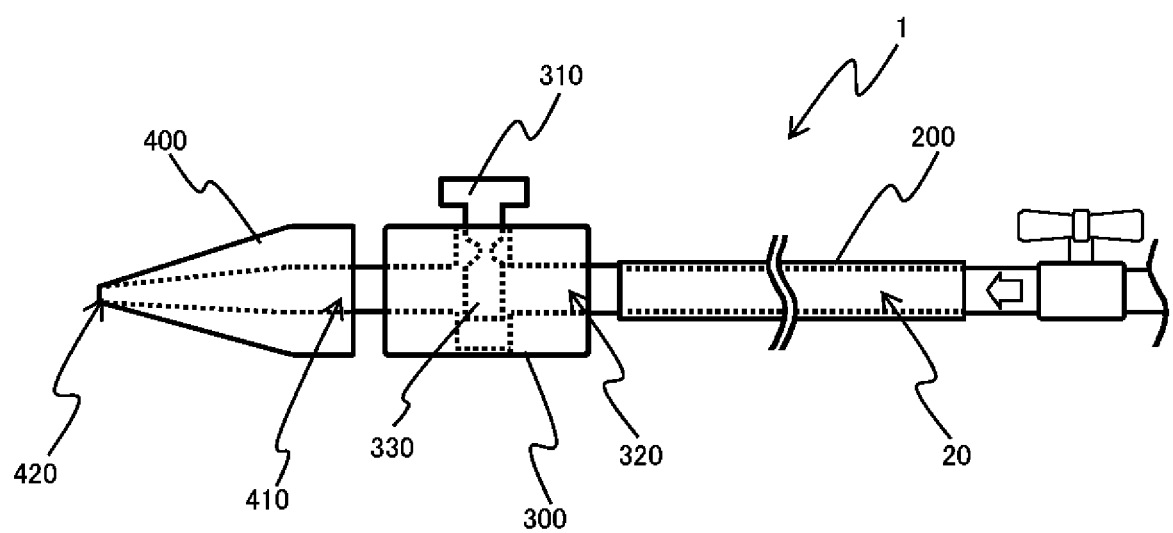
FIG. 4 is a side view of the device for instantaneous removal of blood from fish body in the case of utilizing liquid supplied from water piping.

There now follows a detailed explanation, based on an embodiment shown in the drawings, of the present invention device and method for instantaneous removal of blood from fish body by jetting high-pressure water into haemal arch. FIG. 1 is a side view of a device for instantaneous removal of blood from fish body according to the present invention, and FIG. 2 is a cross-sectional view of a fish tail. FIG. 3 is a flowchart of the method for instantaneous removal of blood from fish body, and FIG. 4 is a side view of the device for instantaneous removal of blood from fish body in the case of utilizing liquid supplied from water piping.

As shown in FIG. 1, an invention device 1 for instantaneous removal of blood from fish body by jetting high-pressure water into haemal arch comprises a pressure applying device 100, a hose 200, a valve 300 and a nozzle 400, which device for instantaneous removal of blood from fish body is adapted to enable instantaneous removal of blood (blood removal) from blood vessels including arteries and veins by insertion of the nozzle 400 into fish haemal arch and thereafter jetting pressure-applied liquid from the nozzle 400.

A fish 10 to be subject to instantaneous removal of blood (blood removal) using the invention device 1 for instantaneous removal of blood from fish body is in advance put in a tail 12 severed condition. As shown in FIG. 2, the tail 12 is in a state with open haemal arch 14. This is for ikijime of the fish by jetting liquid 20 under pressure-applied condition into haemal arch 14 from severed tail 12 so as to instantaneously discharge (remove) blood from blood vessels including arteries and veins. The ikijime is achieved solely by blood flushing and, as such, is both revolutionary and neat, in that no such straightforward contamination removal is seen in conventional blood elimination methods (blood removal/bleeding).

As a fish's backbone tapers from head toward tail, tail side tissue might be destroyed should pressurized liquid be jetted into neural arch or haemal arch from head side, so complete blood removal or blood flushing is performed by jetting pressurized liquid 20 into haemal arch 14 on tail 12 side.

The pressure applying device 100 is a device for applying pressure to and discharging liquid 20, and the pressure-applied liquid 20 is jetted outside through an opening provided in the pressure applying device 100. In the present embodiment the pressure applying device 100 comprises a compressor that after once taking in liquid such as tap water, other water or the like supplied from outside pressurizes the liquid to around 7 Kgf/cm$^2$ for discharge, but it is not limited this configuration. As shown in FIG. 4, an embodiment is possible that does not use the pressure applying device 100 but is structured to pass tap water pressurized and discharged from a water piping tap directly into the hose 200 (pressure supplied from the water piping being at a usable level of about 5 to 7 Kgf/cm$^2$). However, the fact that conventionally required cleansing processes for blood removal are no longer necessary marks an enormous difference.

Moreover, the pressure-applying process of the pressure applying device 100 can alternatively be configured to pressurize using electric or other motive power. For example, one optional configuration is to perform pressurization manually, such as by pressurizing a sealed plastic bottle containing a liquid by charging in additional air with a manual pump and discharging the pressurized liquid to the exterior. Even in the case of manual pressurization, the point that there is absolutely no need for the water cleansing for blood removal required in the prior art constitutes a significant improvement.

The hose 200 is a tube-like member for conveying liquid 20, i.e., pressurized water or the like, discharged from the pressure applying device 100 toward the valve 300 and, as shown in FIG. 1, one end thereof is in a state fixedly connected to the opening of the pressure applying device 100. The present embodiment uses, but is not limited to using, a rubber hose, and a tube of other suitable material can be selected for use insofar as capable of stably conveying pressurized liquid 20.

The valve 300 is a valve for opening/closing flow path of liquid 20 flowing in from the pressure applying device 100 through the hose 200. The valve 300 is of a structure provided with a pair of openings and having a flow path 320 internally communicating the openings via an open-close valve 330, one of which openings is connected to the hose 200. The open-close valve 330 of the valve 300 is normally closed and a conventionally known structure is adopted to control passage of liquid 20 so that pressurized liquid 20 flowing in from the hose 200 flows out from the output side opening in response to open state being established by an operation from outside.

In the present embodiment, the valve 300 is structured to open/close the flow path 320 by putting the open-close valve 330 in open state/closed state upon a button 310 being pushed down or pulled up but is not limited to this configuration and it is possible instead, for example, to adopt a structure that operates the open-close valve 330 by gripping and releasing a lever or the like.

Moreover, the flow path 320 of the present embodiment is formed to extend linearly from the inlet side opening to the outlet side opening of the valve 300 but is not limited to this configuration and it is possible instead to adopt a structure wherein the inlet side opening and the outlet side opening directions are angled 90 degrees from each other.

The nozzle 400, which is a structural member for jetting liquid 20 when the valve 300 is open, is fixedly connected to the outlet side opening of the valve 300. As shown in FIGS. 1 and 4, in the configuration according to the present embodiment, the nozzle 400 is formed to taper from a large diameter base region 410 to a tip region 420, and hole diameter of the tip region 420 is formed thin. The tip diameter can be formed ultrathin or be formed somewhat thin. However, position of the small diameter hole at the tip center must be formed precisely at the center of the nozzle.

Owing to this configuration, insertion into haemal arch of any size becomes possible, thereby enabling provision of a device for instantaneous removal of blood from fish body compatible for tight sealing to haemal arch of various kinds and sizes of fish using a single instrument with no need for nozzle or needle exchange. Moreover, pressurized fluid of amplified pressure can be jetted from the center opening of the tip to perform reliable and rapid blood flushing and removal of blood from blood vessels including arteries and veins (blood removal). Further, since this configuration ensures that haemal arch is sealed by the nozzle 400, the pressurized fluid can reliably perform leak-free instantaneous removal of blood from blood vessels including arteries and veins. In addition, the nozzle 400 inserted into the haemal arch is safe from bending and breaking even if the fish thrashes, so that a device for instantaneous removal of blood from fish body can be provided that is equipped with a nozzle that does not require replacement and excels in durability, economy and convenience.

The invention method 2 for instantaneous removal of blood from fish body by jetting high-pressure water into haemal arch is a method for performing ikijime of fish by jetting pressure-applied liquid 20 into haemal arch 14 from severed tail 12 of fish 10 to thereby instantaneously remove blood from fish body (blood removal/bleeding), and, as shown in FIG. 3, comprises a head severing step 500, a tail severing step 600 and a blood flushing step 700, but comprises no ensuing cleansing step solely for extracting blood.

The head severing step 500 is a step for severing and opening fish medulla oblongata of fish 10. As severing and exposing the medulla oblongata puts the fish 10 in an asphyxiated state, consumption of ATP owing to fish thrashing can be prevented, degradation of taste (mouthfeel) due to accumulation of lactic acid and the like can be inhibited, and rapid nerve extraction processing can be simply and neatly performed.

The tail severing step 600 is for severing tail 12 of fish 10 and, as shown in FIG. 2, is a step for exposing spine and haemal arch 14. This step exposes haemal arch 14 and facilitates performance of blood flushing.

The blood flushing step 700 is for jetting pressure-applied liquid 20 into haemal arch 14 of fish 10 exposed by the tail severing step 600 so as to instantaneously discharge and remove blood contained in blood vessels including arteries and veins (blood removal) and also cleanse said blood vessels. In the present embodiment, a configuration is adopted wherein a tapered nozzle of narrowed tip region diameter is inserted in haemal arch 14 of fish 10 and liquid 20 pressurized by the pressure applying device is jetted at high pressure from tip of the nozzle. Owing to this configuration, blood is reliably discharged (removed) instantaneously from blood vessels including fish arteries and veins, while cleansing of blood vessel interiors is also instantaneously performed to thereby enable neat preservation of freshness without provision of any additional step of cleansing or the like devoted solely to blood extraction.

What is essential for preserving fish freshness is to remove blood from inside the fish body to a satisfactory degree, preferably completely. Namely, since it is residual blood in the fish body that leads to fish rotting, fish freshness can best be preserved over a long period if blood is reliably and completely removed.

More precisely speaking, the problem of lost fish freshness and deliciousness is caused by acceleration of internal organ and other rotting due to germ contamination occurring in residual blood and to oxidative decay of the blood itself. Since use of the device and method for instantaneous removal of blood from fish body according to the present invention enables instantaneous removal of residual blood from fish body (blood removal), propagation of various germs in residual blood can be prevented/inhibited and oxidative decay of residual blood itself can also be prevented, whereby progress of fish decay can be markedly delayed. The device and method for instantaneous removal of blood from fish body according to the present invention are, for example, able to perform removal of blood (blood removal/bleeding) to as far as inside fish roe such as karasumi (mullet roe). So it becomes possible to prevent loss of freshness and taste of karasumi and other internal organs and thus ensure long-term preservation of even fish internal organ freshness and flavor.

Conventional fish processing methods have a drawback in that a blood flushing process cannot be performed other than on a living fish whose heart has not stopped. But when the device and method for instantaneous removal of blood from fish body according to the present invention is used, rapid blood flushing can, for example, be carried out on even fish slaughtered at catch, so long as good quality fish within around 72 hours of catch, thereby making it possible to markedly reduce fish processing and extra cleansing work (blood wash off) after transport to fish market.

EXPLANATION OF SYMBOLS

1 Device for instantaneous removal of blood from fish body

2 Method for instantaneous removal of blood from fish body
10 Fish
12 Tail
14 Haemal arch
20 Liquid
100 Pressure applying device
200 Hose
300 Valve
310 Button
320 Flow path
330 Open-close valve
400 Nozzle
410 Base region
420 Tip region
500 Head severing step
600 Tail severing step
700 Blood flushing step

The invention claimed is:

1. A device to instantaneously remove blood from a fish body by jetting a pressurized liquid into a haemal arch from a severed tail of a fish to perform a fish ikijime or a quality-preserving quick kill, comprising:
    a pressure applying device to apply pressure to a liquid and discharge the pressurized liquid;
    a hose to convey the pressurized liquid discharged from the pressure applying device;
    a valve connected to the hose to open and close a flow path of the pressurized liquid; and
    a nozzle connected to the valve to jet the pressurized liquid when the valve is in an open state;
    wherein the valve opens or closes the flow path in response to a button being pushed down or pulled up;
    wherein an external shape of the nozzle is in a tapered shape narrowing from a a nozzle base region towards a nozzle tip region to insert the nozzle tip region while keeping the haemal arch of any size tightly sealed during an insertion of the nozzle tip region and preventing breakage, bending and damage of the nozzle tip region by a fish movement during the jetting of pressurized liquid; and
    wherein a center hole diameter of the nozzle tip region is formed smaller than a hole diameter of the nozzle base region.

2. A method for instantaneous removal of blood from a fish body by jetting a pressurized liquid into a haemal arch of a fish to perform a fish ikijime or a quality-preserving quick kill by jetting the pressurized liquid into the haemal arch from a severed fish tail, comprising:
    severing a fish head to sever and open a medulla oblongata of the fish;
    severing a fish tail to expose a spine and the haemal arch of the fish; and
    blood flushing by jetting the pressurized liquid into the haemal arch exposed by the severed fish tail, the pressurized liquid being pressurized by a pressure applying device through an inserted nozzle, a hole diameter of a nozzle tip region of the inserted nozzle being smaller than a hole diameter of a nozzle base region, thereby keeping haemal arch of any size tightly sealed during an insertion of the nozzle tip region, and an external shape of the inserted nozzle is in a tapered shape narrowing from the nozzle base region towards the nozzle tip region, thereby preventing breaking, bending and damage of nozzle tip region by a fish movement during the jetting of pressurized liquid.

3. A device to instantaneously remove blood from a fish body to perform a fish ikijime or a quality-preserving quick kill by jetting a pressurized liquid into a haemal arch from severed tail of a fish comprising:
    a hose to convey the pressurized liquid supplied through a water piping;
    a valve connected to the hose to open and close a flow path of the pressurized liquid; and
    a nozzle connected to the valve to jet the pressurized liquid when the valve is in an open state;
    wherein the valve opens or closes the flow path in response to a button being pushed down or pulled up;
    wherein an external shape of the nozzle is formed in a tapered shape narrowing from a nozzle base region toward a nozzle tip region to insert the nozzle tip region while keeping the haemal arch of any size tightly sealed during an insertion of the nozzle tip region and preventing breakage, bending and damage of the nozzle tip region by a fish movement during the jetting of the pressurized liquid; and
    wherein a center hole diameter of the nozzle tip region is formed smaller than a hole diameter of the nozzle base region.

* * * * *